United States Patent
Osawa et al.

(10) Patent No.: US 11,745,547 B2
(45) Date of Patent: Sep. 5, 2023

(54) TYRE

(71) Applicant: Sumitomo Rubber Industries, Ltd., Kobe (JP)

(72) Inventors: Takuya Osawa, Kobe (JP); Shigeki Nishijima, Kobe (JP); Dai Sunazuka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 641 days.

(21) Appl. No.: 16/750,801

(22) Filed: Jan. 23, 2020

(65) Prior Publication Data

US 2020/0254822 A1    Aug. 13, 2020

(30) Foreign Application Priority Data

Feb. 13, 2019 (JP) ................ 2019-023713
Feb. 13, 2019 (JP) ................ 2019-023716
Feb. 13, 2019 (JP) ................ 2019-023718

(51) Int. Cl.
*B60C 11/13* (2006.01)
*B60C 11/03* (2006.01)

(52) U.S. Cl.
CPC ...... *B60C 11/1369* (2013.01); *B60C 11/0304* (2013.01); *B60C 2011/0344* (2013.01); *B60C 2011/0358* (2013.01)

(58) Field of Classification Search
CPC .............. B60C 11/0304; B60C 11/1369
See application file for complete search history.

(56) References Cited

U.S. PATENT DOCUMENTS 4,913,208 A * 4/1990 Anderson ............... B60C 11/13
                                                            152/902
5,152,852 A * 10/1992 Hisamichi ........... B60C 11/0304
                                                          152/209.8
(Continued)

FOREIGN PATENT DOCUMENTS

| EP | 3 042 789 A1 | 7/2016 |
| EP | 3 308 980 A1 | 4/2018 |
| JP | 2015-140047 A | 8/2015 |

OTHER PUBLICATIONS

Extended European Search Report dated Jul. 3, 2020, in European Patent Application No. 20153521.8.

*Primary Examiner* — Robert C Dye
(74) *Attorney, Agent, or Firm* — Birch, Stewart, Kolasch & Birch, LLP

(57) ABSTRACT

A tyre includes a tread portion including first and second land portions. The first middle land portion is provided with first middle lateral grooves traversing the first middle land portion completely. The second middle land portion is provided with second middle lateral grooves traversing the second middle land portion completely. Each of the first middle lateral grooves and the second middle lateral grooves is a curved groove which includes a first convex portion located on a first side with respect to a groove-reference-straight-line that connects both ends of a groove centerline of the curved groove and a second convex portion located on a second side with respect to the groove-reference-straight-line, and a circumferential length of the groove-reference-straight-line of each first middle lateral groove is smaller than a circumferential length of the groove-reference-straight-line of each second middle lateral groove.

12 Claims, 11 Drawing Sheets

(56) References Cited

U.S. PATENT DOCUMENTS

| | | | |
|---|---|---|---|
| 2006/0254684 A1* | 11/2006 | Tamura | B60C 11/13 |
| | | | 152/209.22 |
| 2007/0012389 A1* | 1/2007 | Ito | B60C 11/047 |
| | | | 152/209.22 |
| 2010/0200138 A1 | 8/2010 | Shibano | |
| 2015/0210121 A1 | 7/2015 | Sanae | |
| 2019/0366775 A1* | 12/2019 | Suzuki | B60C 11/0306 |
| 2019/0389255 A1* | 12/2019 | Kubota | B60C 11/0304 |

* cited by examiner

Comparative Example 1

Comparative Example 2

Comparative Example 3

TYRE

BACKGOUND ART

Field of the Disclosure

The present disclosure relates to a tyre, more particularly to a tyre including a tread portion having a designated mounting direction to a vehicle.

Description of the Related Art

Recently, tyres having tread portions with a designated mounting direction to a vehicle have been proposed. For example, the following Patent document 1 discloses a pneumatic tyre including a tread center land portion which is provided with a plurality of center sipes having a width of less than 2 mm, but is not provided with any grooves that have groove widths more than 2 mm and that traverse the land portion completely in the tyre axial direction. The above-mentioned pneumatic tyre enhances stiffness of the tread center land portion, thus expecting to improve steering stability on dry road conditions.
[Patent document 1] Japanese Unexamined Patent Application Publication 2015-140047

SUMMARY OF THE DISCLOSURE

In the above-mentioned pneumatic tyre, since the tread center land portion has high stiffness, vibration of the tread portion tends to be transmitted to a vehicle body, resulting in degradation in ride comfort. In addition, the tread center land portion with high stiffness tends to generate large impact noise upon grounding, leading to deterioration in noise performance. The inventors have found out that the above-mentioned problem can be improved by improving an arrangement of the lateral grooves in tyres having a tread portion with a designated mounting direction.

The present disclosure has been made in view of the above problem and has a major object to provide a tyre capable of improving steering stability, ride comfort and noise performance.

In the first aspect of the disclosure, a tyre includes a tread portion having a designated mounting direction to a vehicle, the tread portion including a first tread edge and a second tread edge to be located outwardly and inwardly of a vehicle, respectively, when being mounted to the vehicle, two or more main grooves extending continuously in a tyre circumferential direction between the first tread edge and the second tread edge, and two or more land portions divided by the main grooves, wherein the main grooves include a first shoulder main groove disposed between the first tread edge and a tyre equator, a second shoulder main groove disposed between the second tread edge and the tyre equator, and a crown main groove disposed between the first shoulder main groove and the second shoulder main groove, the land portions include a first middle land portion defined between the first shoulder main groove and the crown main groove, and a second middle land portion defined between the second shoulder main groove and the crown main groove, the first middle land portion is provided with two or more first middle lateral grooves traversing the first middle land portion completely in a tyre axial direction, the second middle land portion is provided with two or more second middle lateral grooves traversing the second middle land portion completely in the tyre axial direction, in a plan view of the tread portion, each of the first middle lateral grooves and the second middle lateral grooves is a curved groove which includes a first convex portion located on a first side with respect to a groove-reference-straight-line that connects both ends of a groove centerline of the curved groove and a second convex portion located on a second side with respect to the groove-reference-straight-line, and a length in the tyre circumferential direction of the groove-reference-straight-line of each first middle lateral groove is smaller than a length in the tyre circumferential direction of the groove-reference-straight-line of each second middle lateral groove.

In the first aspect of the disclosure, it is preferable that the length in the tyre circumferential direction of the groove-reference-straight-line of each second middle lateral groove may be smaller than pitch lengths in the tyre circumferential direction of the second middle lateral grooves.

In the first aspect of the disclosure, it is preferable that the groove-reference-straight-line of each first middle lateral groove may be inclined in a first direction with respect to the tyre axial direction, and the groove-reference-straight-line of each second middle lateral groove may be inclined in a second direction which is opposite to the first direction with respect to the tyre axial direction.

In the first aspect of the disclosure, it is preferable that a maximum distance of each first middle lateral groove between a groove edge thereof and the groove-reference-straight-line thereof may be smaller than a maximum distance of each second middle lateral groove between a groove edge thereof and the groove-reference-straight-line thereof.

In the first aspect of the disclosure, it is preferable that the land portions may include a first shoulder land portion defined between the first shoulder main groove and the first tread edge, the first shoulder land portion may be provided with two or more first shoulder lateral grooves traversing the first shoulder land portion completely in the tyre axial direction, and at least one of the first shoulder lateral grooves may include a shallow bottom portion having a raised bottom face in an end region on the first shoulder main groove side thereof.

In the first aspect of the disclosure, it is preferable that the curved groove may have an S-shaped manner.

In the second aspect of the disclosure, a tyre includes a tread portion having a designated mounting direction to a vehicle, the tread portion including a first tread edge and a second tread edge to be located outwardly and inwardly of a vehicle, respectively, when being mounted to the vehicle, two or more main grooves extending continuously in a tyre circumferential direction between the first tread edge and the second tread edge, and two or more land portions divided by the main grooves, wherein the main grooves include a first shoulder main groove disposed between the first tread edge and a tyre equator, a second shoulder main groove disposed between the second tread edge and the tyre equator, and a crown main groove disposed between the first shoulder main groove and the second shoulder main groove, the land portions include a first middle land portion defined between the first shoulder main groove and the crown main groove, and a second middle land portion defined between the second shoulder main groove and the crown main groove, the first middle land portion is provided with two or more first middle lateral grooves traversing the first middle land portion completely in a tyre axial direction, the second middle land portion is provided with two or more second middle lateral grooves traversing the second middle land portion completely in the tyre axial direction, in a plan view of the tread portion, each of the first middle lateral grooves and the second middle lateral grooves includes a center portion traversing the center location in the tyre axial direction of either one of the first middle land portion or the second middle land portion obliquely, a first outer portion extending from one end side of the center portion at a smaller angle with respect to the tyre axial direction than that of the center portion, and a second outer portion extending from the other end side of the center portion at a smaller angle with respect to the tyre axial direction than that of the center portion, an angle θ1 of the center portion of each first middle lateral groove with respect to the tyre axial direction is smaller than an angle θ2 of the center portion of each second middle lateral groove with respect to the tyre axial direction.

In the second aspect of the disclosure, it is preferable that the angle θ1 may be in a range of from 5 to 40 degrees.

In the second aspect of the disclosure, it is preferable that the angle θ2 may be in a range of from 20 to 60 degrees.

In the second aspect of the disclosure, it is preferable that in each of the of the first middle lateral grooves and the second middle lateral grooves, the center portion may include a raised portion in which a groove bottom thereof is raised, and a length in the tyre axial direction of the raised portion may be greater than those in the tyre axial direction of the first outer portion and the second outer portion.

In the second aspect of the disclosure, it is preferable that in each first middle lateral groove, a length in the tyre axial direction of the first outer portion may be same as a length in the tyre axial direction of the second outer portion.

In the second aspect of the disclosure, it is preferable that in each first middle lateral groove, a length in the tyre axial direction of the first outer portion may be same as a length in the tyre axial direction of the second outer portion.

In the second aspect of the disclosure, it is preferable that the land portions may include a first shoulder land portion defined between the first shoulder main groove and the first tread edge, the first shoulder land portion may be provided with two or more first shoulder lateral grooves traversing the first shoulder land portion completely in the tyre axial direction, and an inner end in the tyre axial direction of at least one of the first shoulder lateral grooves may be located in a different position in the tyre circumferential direction from axially outer ends of the respective first middle lateral grooves.

In the second aspect of the disclosure, it is preferable that a minimum distance in the tyre circumferential direction between the inner end of the at least one of the first shoulder lateral grooves and the outer ends of the respective first middle lateral grooves may be equal to or less than 0.35 times pitch lengths P3 in the tyre circumferential direction of the first shoulder lateral grooves.

In the second aspect of the disclosure, it is preferable that the curved groove may have an S-shaped manner.

In the third aspect of the disclosure, a tyre includes a tread portion having a designated mounting direction to a vehicle, the tread portion including a first tread edge and a second tread edge to be located outwardly and inwardly of a vehicle, respectively, when being mounted to the vehicle, two or more main grooves extending continuously in a tyre circumferential direction between the first tread edge and the second tread edge, and two or more land portions divided by the main grooves, wherein the main grooves include a first shoulder main groove disposed between the first tread edge and a tyre equator, a second shoulder main groove disposed between the second tread edge and the tyre equator, and a crown main groove disposed between the first shoulder main groove and the second shoulder main groove, the land portions include a first middle land portion defined between the first shoulder main groove and the crown main groove, a second middle land portion defined between the second shoulder main groove and the crown main groove, a first shoulder land portion defined between the first shoulder main groove and the first tread edge, and a second shoulder land portion defined between the second shoulder main groove and the second tread edge, the second middle land portion is provided with two or more second middle lateral grooves traversing the second middle land portion completely in the tyre axial direction, each of the second middle lateral grooves is a curved groove which includes a first convex portion located on a first side with respect to a groove-reference-straight-line that connects both ends of a groove centerline of the curved groove and a second convex portion located on a second side with respect to the groove-reference-straight-line, and the second shoulder land portion is provided with two or more second shoulder lateral grooves extending from the second tread edge inwardly in the tyre axial direction and terminating so as to have terminating ends within the second shoulder land portion, two or more connecting sipes extending from the terminating ends of the respective second shoulder lateral grooves to the second shoulder main groove, and two or more non-traversing narrow grooves extending from the second shoulder main groove and terminating within the second shoulder land portion.

In the third aspect of the of the disclosure, it is preferable that a length in the tyre axial direction of each non-traversing narrow groove may be greater than a length in the tyre axial direction of each connecting sipe.

In the third aspect of the of the disclosure, it is preferable that each of the second middle lateral grooves may include a raised portion in which a groove bottom thereof is raised and traverses a center location in the tyre axial direction of the second middle land portion, a first outer portion located on a first end side of the raised portion, and a second outer portion located on a second end side of the raised portion, and a length in the tyre axial direction of the raised portion may be greater than those in the tyre axial direction of the first outer portion and the second outer portion.

In the third aspect of the of the disclosure, it is preferable that the non-traversing narrow grooves may be arranged so as to be continuous to the respective second middle lateral grooves smoothly through the second shoulder main groove.

In the third aspect of the of the disclosure, it is preferable that the curved groove may have an S-shaped manner.

DESCRIPTION OF THE PREFERRED EMBODIMENTS

DESCRIPTION OF THE PREFERRED EMBODIMENTS

Figure 1:
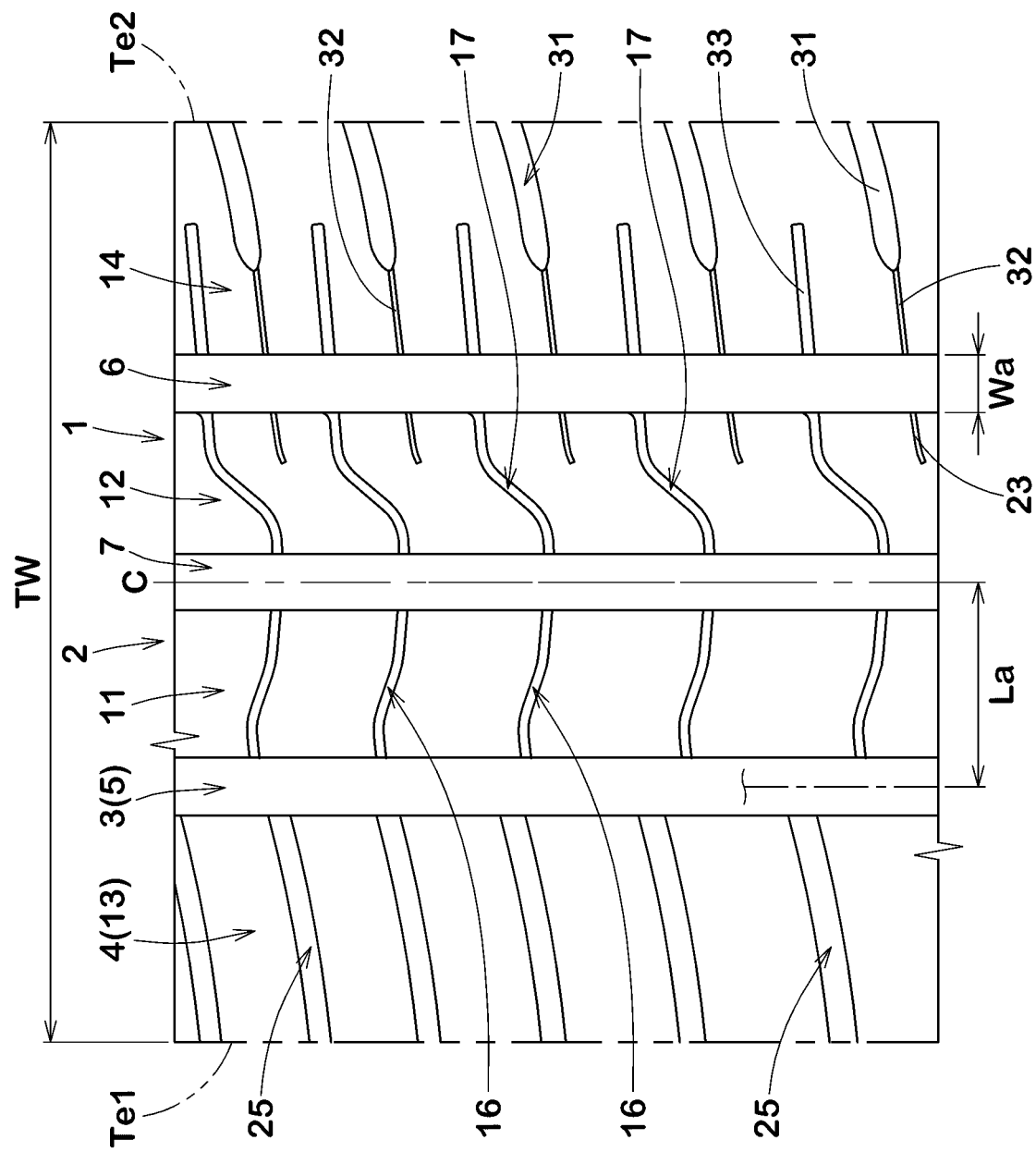
FIG. 1 is a development view of a tread portion of a tyre in accordance with an embodiment of the present disclosure.

An embodiment of the present disclosure will be explained below with reference to the accompanying drawings. FIG. 1 illustrates a development view of a tread portion 2 of a tyre 1 in accordance with an embodiment of the present disclosure. The tyre 1 according to the present embodiment is preferably embodied as a pneumatic tyre for passenger car. Note that the tyre 1 is not limited to such an aspect but can be embodied as a heavy-duty tyre and a non-pneumatic tyre which can structurally support the tyre load without being inflated with a compressed air, for example.

As illustrated in FIG. 1, the tyre 1 according to the present disclosure includes the tread portion 2 having a designated mounting direction to a vehicle. The tread portion 2 includes a first tread edge Te1 to be located outwardly of a vehicle when being mounted to the vehicle, and a second tread edge Te2 to be located inwardly of the vehicle when being mounted to the vehicle. The mounting direction to a vehicle may be indicated on a sidewall portion (not illustrated) using a letter or mark.

The first tread edge Te1 and the second tread edge Te2, when the tyre 1 is a pneumatic tyre, are the axial outermost edges of the ground contacting patch of the tyre 1 which occurs under a normal condition with a standard tyre load when the camber angle of the tyre is zero. As used herein, the "normal condition" is such that the tyre 1 is mounted onto a standard wheel rim with a standard pressure but loaded with no tyre load. Unless otherwise noted, dimensions of respective portions of the tyre 1 are values measured under the normal condition.

The "standard wheel rim" is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

The "standard pressure" is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

The standard tyre load is a tyre load officially approved for each tyre by standards organizations in which the tyre is based, wherein the standard tyre load is the "maximum load capacity" in JATMA, the maximum value given in the above-mentioned table in TRA, the "Load Capacity" in ETRTO, for example.

The tread portion 2 includes two or more main grooves 3 extending continuously in the tyre circumferential direction between the first tread edge Te1 and the second tread edge Te2, and two or more land portions 4 divided by the main grooves 3.

The main grooves 3 include a first shoulder main groove 5 disposed between the first tread edge Te1 and the tyre equator C, a second shoulder main groove 6 disposed between the second tread edge Te2 and the tyre equator C, and a crown main groove 7 disposed between the first shoulder main groove 5 and the second shoulder main groove 6.

It is preferable that a length La in the tyre axial direction from the tyre equator C to a groove centerline of either one of the first shoulder main groove 5 or the second shoulder main groove 6, for example, is in a range of from 0.15 to 0.30 times the tread width TW. The tread width TW is a distance in the tyre axial direction from the first tread edge Te1 to the second tread edge Te2 under the normal condition.

As the crown main groove 7 according to the present embodiment, a single crown groove is provided on the tyre equator C, for example. In another aspect, two crown main groove 7 may be provided such that the tyre equator C is located therebetween, for example.

Each main groove 3 according to the present embodiment, for example, extends in a straight shape parallel with the tyre circumferential direction, i.e., having a pair of groove edges extending straight shape parallel with the tyre circumferential direction. Alternatively, the main grooves 3, for example, may extend in a zigzag or wavy manner.

It is preferable that a groove width Wa of the main grooves 3, for example, is in a range of from 4.0% to 7.0% of the tread width TW. It is preferable that a depth of the main grooves 3, for example, is in a range of from 5 to 10 mm for a pneumatic passenger car tyre.

The land portions 4 include a first middle land portion 11, a second middle land portion 12, a first shoulder land portion 13, and a second shoulder land portion 14. The tread portion 2 according to the present embodiment has a four-rib pattern which is configured by three main grooves 3 and four land portions 4. In another aspect of the present disclosure, the tread portion 2 may have a five-rib pattern which is configured by five land portions 4 divided by four main grooves including two crown main grooves 7, for example.

The first middle land portion 11 is defined between the first shoulder main groove 5 and the crown main groove 7. The second middle land portion 12 is defined between the second shoulder main groove 6 and the crown main groove 7. The first shoulder land portion 13 is defined between the first shoulder main groove 5 and the first tread edge Te1. The second shoulder land portion 14 is defined between the second shoulder main groove 6 and the second tread edge Te2.

Figure 2:
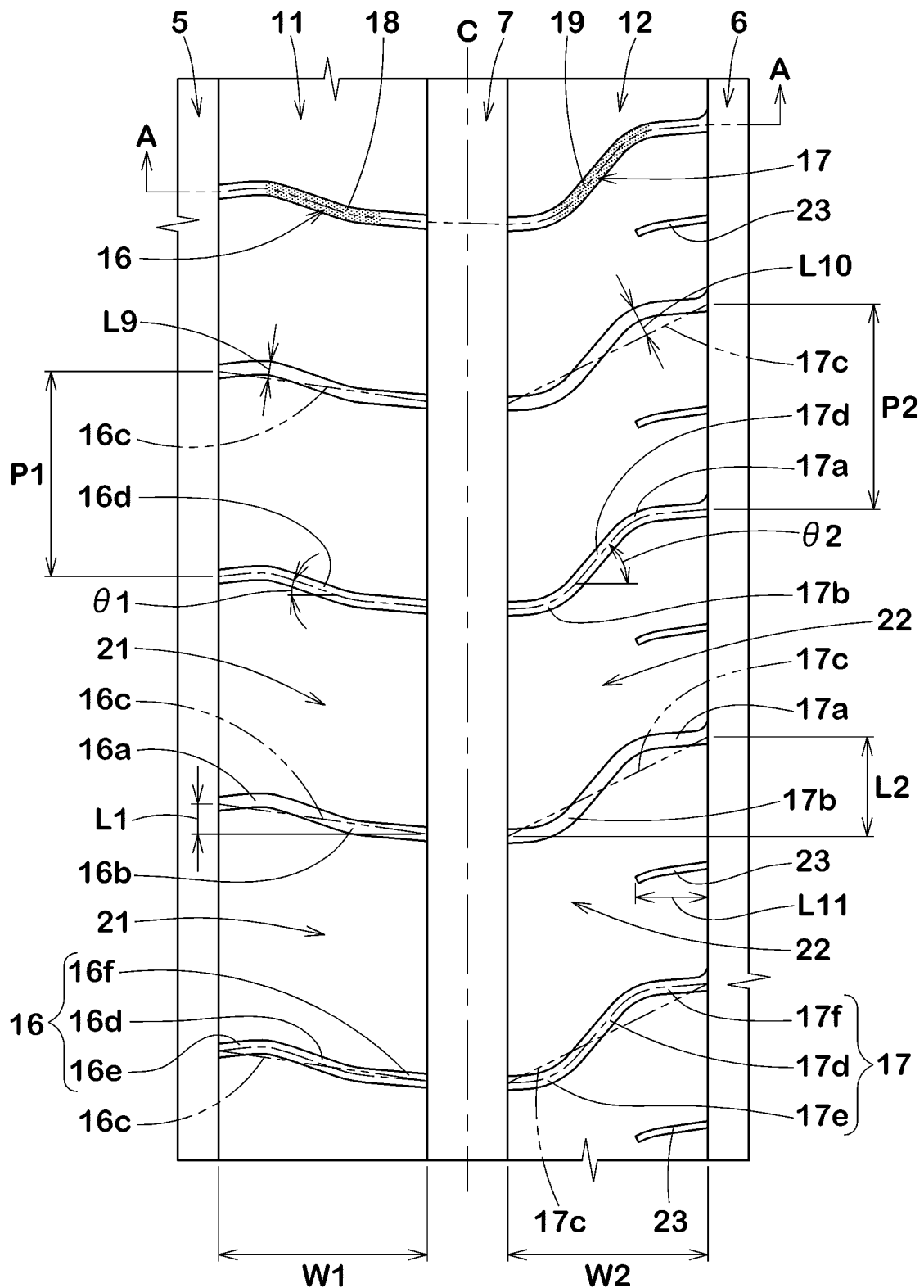
FIG. 2 is an enlarged view of a first middle land portion and a second middle land portion of FIG. 1.

FIG. 2 illustrates an enlarged view of the first middle land portion 11 and the second middle land portion 12. As illustrated in FIG. 2, it is preferable that widths W1 and W2 in the tyre axial direction of the first middle land portion 11 and the second middle land portion 12, respectively, are preferably in a range of from 0.10 to 0.25 times the tread width TW, for example.

The first middle land portion 11 is provided with two or more first middle lateral grooves 16. The first middle lateral grooves 16 traverse the first middle land portion 11 completely in the tyre axial direction. The second middle land portion 12 is provided with two or more second middle lateral grooves 17. The second middle lateral grooves 17 traverse the second middle land portion 12 completely in the tyre axial direction. A groove width of the first middle lateral grooves 16 and the second middle lateral grooves 17, for example, is in a range of from 0.10 to 0.20 times a groove width of the crown main groove 7.

In a plan view of the tread portion, each of the first middle lateral grooves 16 is a curved groove which includes a first convex portion 16a located on a first side with respect to a groove-reference-straight-line 16c that connects both ends of a groove centerline thereof and a second convex portion 16b located on a second side with respect to the groove-reference-straight-line 16c. Similarly, each of the second middle lateral grooves 17 is a curved groove which includes a first convex portion 17a located on the first side with respect to a groove-reference-straight-line 17c that connects both ends of a groove centerline thereof and a second convex portion 17b located on the second side with respect to the groove-reference-straight-line 17c. In some preferred embodiments, the curved grooves have an S-shaped manner.

Since the first middle lateral grooves 16 and the second middle lateral grooves 17 can mitigate stiffness of the respective middle land portions moderately, improving ride comfort as well as reducing impact noise generated by the respective middle land portions. In particular, the S-shaped first and second middle lateral grooves 16 and 17 can facilitate deformation along the respective groove-reference-straight-lines so that impact noise can be reduced effectively. In addition, the above-mentioned curved grooves can help to reduce pumping noise upon grounding since the curved grooves enable to make the air flowing in the grooves slow down.

In the present embodiment, it is preferable that a length L1 in the tyre circumferential direction of the groove-reference-straight-line 16c of each first middle lateral groove 16 is smaller than a length L2 in the tyre circumferential direction of the groove-reference-straight-line 17c of each second middle lateral groove 17. Such a groove arrangement enables to enhance stiffness in the tyre axial direction of the first middle land portion 11 relatively. Thus, upon cornering where the center of the ground contacting surface moves toward the first tread edge Te1, a linear steering response can be obtained which provides better steering stability.

It is preferable that the length L1 in the tyre circumferential direction of the groove-reference-straight-line 16c of each first middle lateral groove 16 is in a range of from 0.20 to 0.40 times the length in the tyre circumferential direction of the groove-reference-straight-line 17c of each second middle lateral groove 17. Such a groove arrangement can improve a linear steering response upon cornering further.

It is preferable that the length L1 in the tyre circumferential direction of the groove-reference-straight-line 16c of each first middle lateral groove 16, for example, is smaller than pitch lengths P1 in the tyre circumferential direction of the first middle lateral grooves 16. Specifically, the length L1 in the tyre circumferential direction of the groove-reference-straight-line 16c of each first middle lateral groove 16 is preferably in a range of from 0.05 to 0.20 times the pitch lengths P1 in the tyre circumferential direction of the first middle lateral grooves 16, for example. An arrangement of the first middle lateral grooves 16 as such helps to prevent uneven wear of the first middle land portion 11.

In the same view point, it is preferable that the length L2 in the tyre circumferential direction of the groove-reference-straight-line 17c of each second middle lateral groove 17, for example, is smaller than pitch lengths P2 in the tyre circumferential direction of the second middle lateral grooves 17. Specifically, the length L2 in the tyre circumferential direction of the groove-reference-straight-line 17c of each second middle lateral groove 17 is preferably in a range of from 0.40 to 0.55 times the pitch lengths P2 in the tyre circumferential direction of the second middle lateral grooves 17, for example. Note that the pitch lengths P2 of the second middle lateral grooves 17 are the same as the pitch lengths P1 of the first middle lateral grooves 16.

Each first middle lateral groove 16 includes a center portion 16d traversing the center location in the tyre axial direction of the first middle land portion 11 obliquely, a first outer portion 16e, and a second outer portion 16f. The first outer portion 16e extends from one end side of the center portion 16d at a smaller angle with respect to the tyre axial direction than that of the center portion 16d. The second outer portion 16f extends from the other end side of the center portion 16d at a smaller angle with respect to the tyre axial direction than that of the center portion 16d. In the present embodiment, the first outer portion 16e is arranged on the first tread edge Te1 side with respect to the center portion 16d, and the second outer portion 16f is arranged on the second tread edge Te2 side with respect to the center portion 16d.

Similarly, each second middle lateral groove 17 includes a center portion 17d traversing the center location in the tyre axial direction of the second middle land portion 12 obliquely, a first outer portion 17e, and a second outer portion 17f. The first outer portion 17e extends from one end side of the center portion 17d at a smaller angle with respect to the tyre axial direction than that of the center portion 17d. The second outer portion 17f extends from the other end side of the center portion 17d at a smaller angle with respect to the tyre axial direction than that of the center portion 17d. In the present embodiment, the first outer portion 17e is arranged on the first tread edge Te1 side with respect to the center portion 17d, and the second outer portion 17f is arranged on the second tread edge Te2 side with respect to the center portion 17d.

In the present embodiment, the groove-reference-straight-line 16c of each first middle lateral groove 16, for example, is inclined in a first direction (e.g. downward to the right) with respect to the tyre axial direction. In addition, it is preferable that the center portion 16d of each first middle lateral groove 16 is inclined in the first direction with respect to the tyre axial direction. In each first middle lateral groove 16, an angle θ1 of the center portion 16d with respect to the tyre axial direction is greater than an angle of the groove-reference-straight-line 16c with respect to the tyre axial direction. Specifically, the angle θ1 of the center portion 16d of each first middle lateral groove 16 with respect to the tyre axial direction is preferably in a range of from 5 to 40 degrees, more preferably from 15 to 30 degrees.

In the present embodiment, the groove-reference-straight-line 17c of each second middle lateral groove 17, for example, is inclined with respect to the tyre axial direction in a second direction (e.g., upward to the right) opposite to the first direction. In addition, it is preferable that the center portion 17d of each second middle lateral groove 17 is inclined in the second direction with respect to the tyre axial direction. In each second middle lateral groove 17, an angle θ2 of the center portion 17d with respect to the tyre axial direction is greater than an angle of the groove-reference-straight-line 17c with respect to the tyre axial direction. Specifically, the angle θ2 of the center portion 17d of each second middle lateral groove 17 with respect to the tyre axial direction is preferably in a range of from 20 to 60 degrees, more preferably from 40 to 55 degrees.

In the present embodiment, the angle θ1 of the center portion 16d of each first middle lateral groove 16 with respect to the tyre axial direction is smaller than the angle θ2 of the center portion 17d of each second middle lateral groove 17 with respect to the tyre axial direction. Thus, stiffness of the first middle land portion 11 in the tyre axial direction can be enhanced relatively, improving steering stability further.

Figure 3:
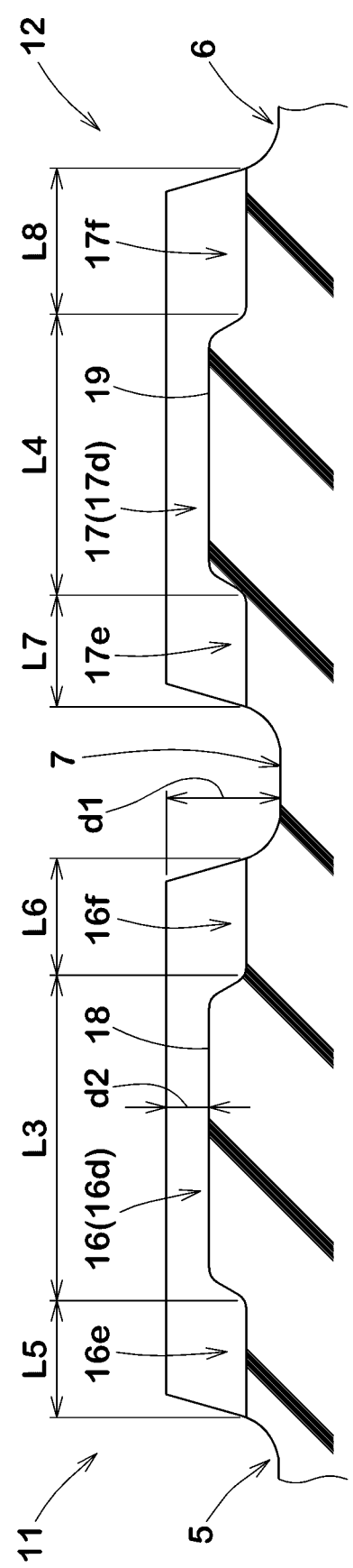
FIG. 3 is a cross-sectional view taken along line A-A of FIG. 2.

FIG. 3 illustrates a cross-sectional view of one of the first middle lateral grooves 16 and one of the second middle lateral grooves 17 taken along line A-A of FIG. 2. As illustrated in FIG. 3, in the present disclosure, the center portion 16d of each first middle lateral groove 16 includes a raised portion 18 in which a groove bottom thereof is raised. In the present embodiment, the entire region of the center portion 16d is configured as the raised portion 18. Similarly, the center portion 17d of each second middle lateral groove 17 includes a raised portion 19 in which a groove bottom thereof is raised. In the present embodiment, the entire region of the center portion 17d is configured as the raised portion 19. Note that to help understand the raised portions 18 and 19, they are colored on one of the first middle lateral grooves 16 and one of the second middle lateral grooves 17 in FIG. 2.

As illustrated in FIG. 3, a depth d2 of the raised portions 18 and 19, for example, is preferably equal to or more than 0.10 times, more preferably equal to or more than 0.20 times a depth d1 of the crown main groove 7, but preferably equal to or less than 0.60 times, more preferably equal to or less than 0.50 times the depth d1. In addition, the first middle lateral grooves 16 and the second middle lateral grooves 17, at both ends thereof in the tyre axial direction, have a depth in a range of from 0.30 to 0.80 times the depth d1 of the crown main groove 7. The first middle lateral grooves 16 and the second middle lateral grooves 17 configured as such can improve steering stability and ride comfort in a well-balanced manner.

A length L3 in the tyre axial direction of the raised portions 18 of the first middle lateral grooves 16 is greater than a length L4 in the tyre axial direction of the raised portions 19 of the second middle lateral grooves 17. Specifically, the length L3 of the raised portions 18 of the first middle lateral grooves 16 is in a range of from 1.05 to 1.25 times the length L4 of the raised portions 19 of the second middle lateral grooves 17. Such a configuration of the raised portions 18 and 19 can enhance stiffness of the first middle land portion 11, helping to exert superior steering stability.

The length L3 in the tyre axial direction of the raised portions 18 of the first middle lateral grooves 16 is in a range of from 0.30 to 0.80 times the width W1 (shown in FIG. 2) in the tyre axial direction of the first middle land portion 11, for example. The length L4 in the tyre axial direction of the raised portions 19 of the second middle lateral grooves 17 is in a range of from 0.30 to 0.80 times the width W2 (shown in FIG. 2) in the tyre axial direction of the second middle land portion 12, for example.

In each first middle lateral groove 16, a length L3 in the tyre axial direction of the raised portion 18 is greater than a length L5 in the tyre axial direction of the first outer portion 16e and a length L6 in the tyre axial direction of the second outer portion 16f. Similarly, in each second middle lateral groove 17, a length L4 in the tyre axial direction of the raised portion 19 is greater than a length L7 in the tyre axial direction of the first outer portion 17e and a length L8 in the tyre axial direction of the second outer portion 17f. The first middle lateral grooves 16 and the second middle lateral grooves 17 configured as such can enhance stiffness of the first middle land portion 11 and the second middle land portion 12 sufficiently, exerting superior steering stability.

In each first middle lateral groove 16, the length L6 in the tyre axial direction of the second outer portion 16f is preferably in a range of from 0.90 to 1.10 times the length L5 in the tyre axial direction of the first outer portion 16e. In the present embodiment, in each first middle lateral groove 16, the length L6 of the second outer portion 16f is the same as the length L5 of the first outer portion 16e.

In each second middle lateral groove 17, it is preferable that the length L8 in the tyre axial direction of the second outer portion 17f is greater than the length L7 in the tyre axial direction of the first outer portion 17e. Specifically, the length L8 of the second outer portion 17f, for example, is preferably in a range of from 1.10 to 2.00 times the length L7 of the first outer portion 17e. Thus, stiffness of the second middle lateral grooves 17 on the first tread edge Te1 side can be enhanced, enabling to provide a linear steering response upon cornering.

Further, by configuring the raised portions 18 and 19 as described above, the respective ranges of frequency of pumping noise generated by the first middle lateral grooves 16 and the second middle lateral grooves 17 can be deviated, generating white noise.

As illustrated in FIG. 2, a maximum distance L9 of each first middle lateral groove 16 between a groove edge thereof and the groove-reference-straight-line 16c thereof is smaller than a maximum distance L10 of each second middle lateral groove 17 between a groove edge thereof and the groove-reference-straight-line 17c thereof. Thus, stiffness of the first middle land portion 11 can be enhanced relatively to the second middle land portion, and the above-mentioned effects can further be improved.

It is preferable that the first middle lateral grooves 16 are arranged so as to be continuous to the respective second middle lateral grooves 17 smoothly through the crown main groove 7. As used herein, "one lateral groove is continuous to another lateral groove smoothly through a main groove" shall mean that respective regions in which the lateral grooves are elongated along the respective groove longitudinal directions, in the tyre circumferential direction, overlap with one another within the main groove, or that the respective regions, in the tyre circumferential direction, are located away from one another within a distance of less than 1.0 mm within the main groove. If a lateral groove is curved, the above-mentioned region is defined such that the lateral groove is elongated while keeping the radius of curvature of an axial end thereof on the main groove side.

The first middle land portion 11 includes a plurality of first middle blocks 21 divided by the first middle lateral grooves 16. The second middle land portion 12 includes a plurality of second middle blocks 22 divided by the second middle lateral grooves 17.

In the present embodiment, each first middle blocks 21, for example, is a smooth block having a ground contacting face which is not provided with any grooves nor sipes. As used herein, "sipe" shall mean a narrow cut having a width of less than 1.5 mm.

Each second middle block 22 is provided with a second middle sipe 23 which extends from the second shoulder main groove 6 and which terminates within the second middle block 22. In the present embodiment, the second middle sipe 23, for example, has a width of from 0.5 to 1.0 mm. Such first middle blocks 21 and second middle blocks 22 can enhance stiffness of the first middle land portion 11 relatively, providing a linear steering response so that steering stability can be improved.

It is preferable that a length L11 in the tyre axial direction of each second middle sipe 23, for example, is in a range of from 0.20 to 0.80 times the width W2 in the tyre axial direction of the second middle land portion 12. Such a second middle sipe 23 can help to improve steering stability and ride comfort in a well-balanced manner.

It is preferable that the raised portion 19 of each second middle lateral groove 17 overlaps with the respective second middle sipes 23 in the tyre axial direction. Thus, the second middle sipes 23 can help to reduce impact noise generated when the second middle land portion 12 grounds, improving noise performance.

For example, a maximum depth of the second middle sipes 23 is in a range of from 0.90 to 1.10 times the depths of the raised portions 19 of the second middle lateral grooves 17. In the present embodiment, the maximum depth of the second middle sipes 23 is the same as the depths of the raised portions 19 of the second middle lateral grooves 17. The second middle sipes 23 can help to prevent uneven wear of the second middle land portion 12.

Figure 4:
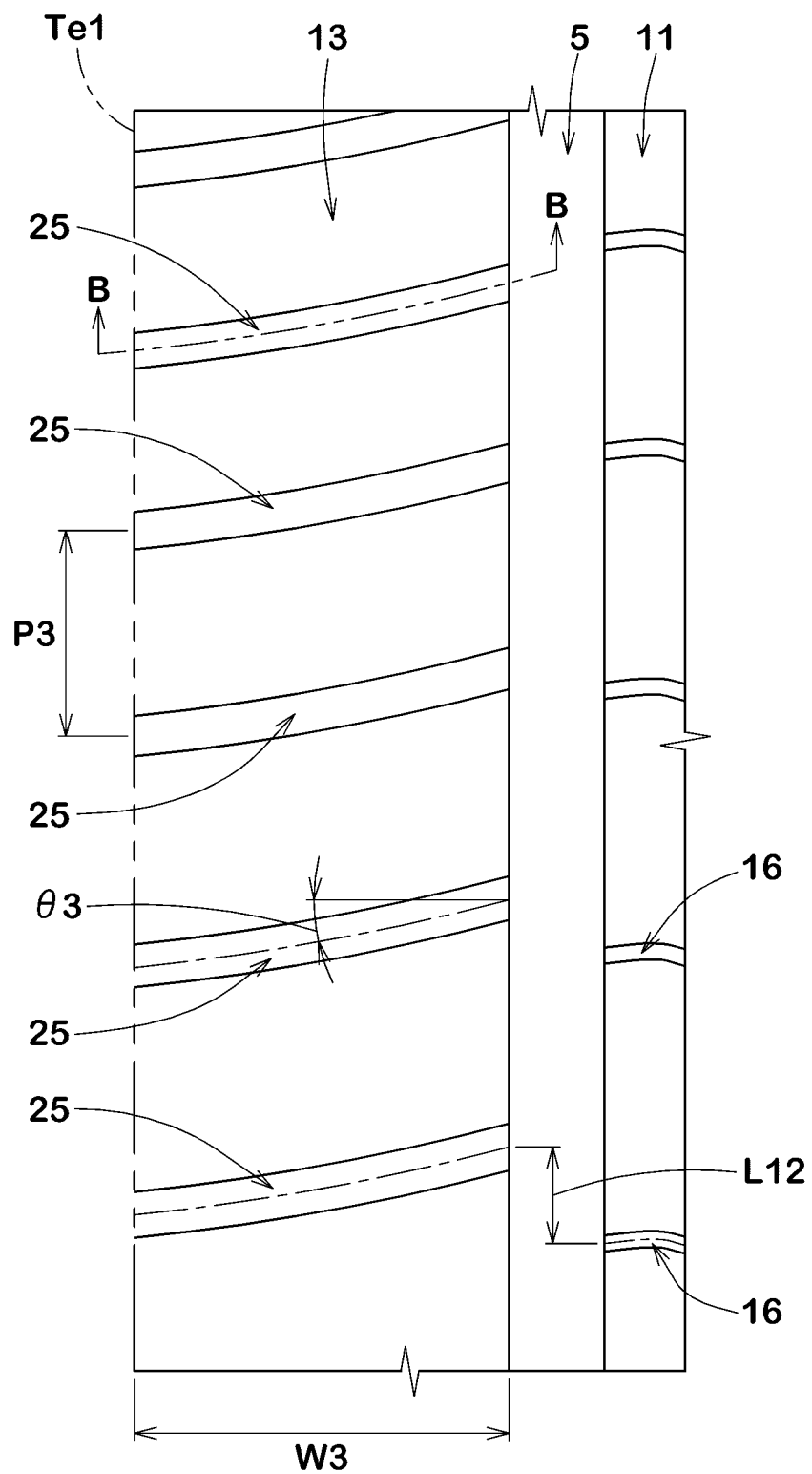
FIG. 4 is an enlarged view of a first shoulder land portion of FIG. 1.

FIG. 4 illustrates an enlarged view of the first shoulder land portion 13. As illustrated in FIG. 4, the first shoulder land portion 13 is provided with a plurality of first shoulder lateral grooves 25 traversing the first shoulder land portion 13 completely in the tyre axial direction. A groove width of the plurality of first shoulder lateral grooves 25, for example, is in a range of from 0.35 to 0.50 times the groove width of the first shoulder main groove 5.

Each first shoulder lateral groove 25, for example, is inclined in the second direction. An angle θ3 of the first shoulder lateral grooves 25, for example, is in a range of from 5 to 15 degrees with respect to the tyre axial direction.

It is preferable that one or more axially inner ends of the first shoulder lateral grooves 25 are located in different positions in the tyre circumferential direction from the axially outer ends of the respective first middle lateral grooves 16. In addition, it is preferable that a distance L12 in the tyre circumferential direction between the groove centerlines of the inner ends of the first shoulder lateral grooves 25 and the outer ends of the first middle lateral grooves 16, for example, is equal to or less than 0.35 times pitch lengths P3 in the tyre circumferential direction of the first shoulder lateral grooves 25. Thus, pumping noise generated when regions of intersections of the first shoulder lateral grooves 25 and the first shoulder main groove 5 come into contact with the ground can be reduced.

Figure 5:
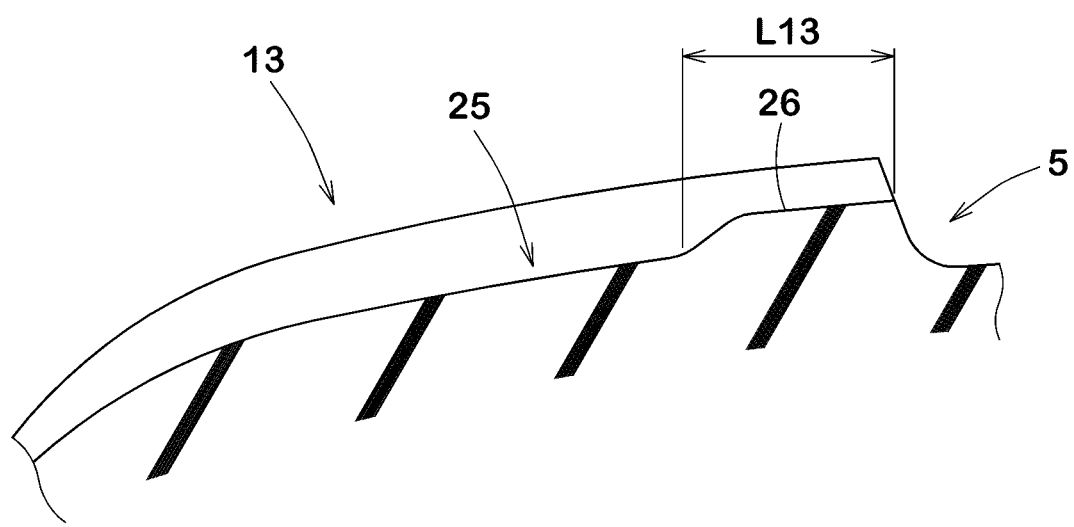
FIG. 5 is a cross-sectional view taken along line B-B of FIG. 4.

FIG. 5 illustrates a cross-sectional view of one of the first shoulder lateral grooves 25 taken along line B-B of FIG. 4. As illustrated in FIG. 5, one or more first shoulder lateral grooves 25 include a shallow bottom portion 26 having a raised bottom face in an end region on the first shoulder main groove 5 side thereof. Such first shoulder lateral grooves 25 can enhance stiffness of the first shoulder land portion 13, improving steering stability.

Preferably, a length L13 in the tyre axial direction of the shallow bottom portion 26 of the first shoulder lateral grooves 25, for example, is in a range of from 0.20 to 0.30 times the width W3 (shown in FIG. 4) in the tyre axial direction of the first shoulder land portion 13. In some preferred embodiments, the length L13 in the tyre axial direction of the shallow bottom portion 26 of the first shoulder lateral grooves 25, for example, is smaller than lengths L3 and L4 of the raised portions 18 (shown in FIGS. 3) and 19 (shown in FIG. 4) of the first middle lateral grooves 16 and the second middle lateral grooves 17, respectively. The first shoulder lateral groove 25 configured as such can prevent excessive increase of stiffness of the first shoulder land portion 13, helping to improve steering stability and ride comfort in a well-balanced manner.

Figure 6:
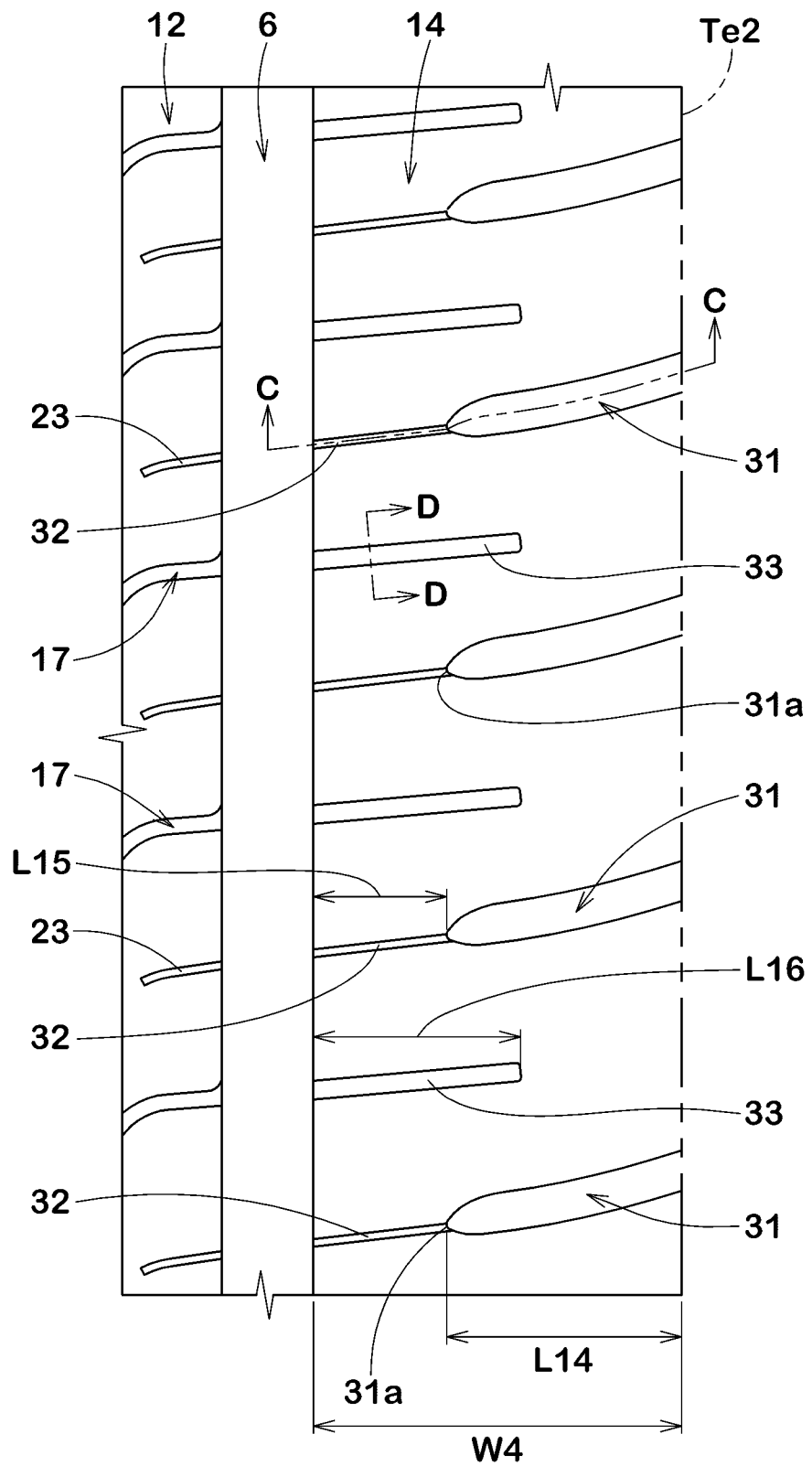
FIG. 6 is an enlarged view of a second shoulder land portion of FIG. 1.

FIG. 6 illustrates an enlarged view of the second shoulder land portion 14. As illustrated in FIG. 6, the second shoulder land portion 14, for example, is provided with a plurality of second shoulder lateral grooves 31, a plurality of connecting sipes 32, and a plurality of non-traversing narrow grooves 33.

Each second shoulder lateral groove 31, for example, extends from the second tread edge Te2 inwardly in the tyre axial direction and terminates so as to have a terminating end 31a within the second shoulder land portion 14. A length L14 in the tyre axial direction of the second shoulder lateral grooves 31, for example, is in a range of from 0.50 to 0.70 times the width W4 in the tyre axial direction of the second shoulder land portion 14. A groove width of the second shoulder lateral grooves 31, for example, is in a range of from 0.30 to 0.50 times the groove width of the second shoulder main groove 6.

Each connecting sipe 32 extends from the terminating end 31a of a respective one of the second shoulder lateral grooves 31 to the second shoulder main groove 6. A length L15 in the tyre axial direction of the connecting sipes 32, for example, is in a range of from 0.30 to 0.50 times the width W4 in the tyre axial direction of the second shoulder land portion 14. The second shoulder lateral grooves 31 and the connecting sipes 32 can help to ensure stiffness of the second shoulder land portion 14, exerting superior steering stability. In addition, the second shoulder lateral grooves 31 and the connecting sipes 32 can generate less pumping noise, improving noise performance.

Figure 7:
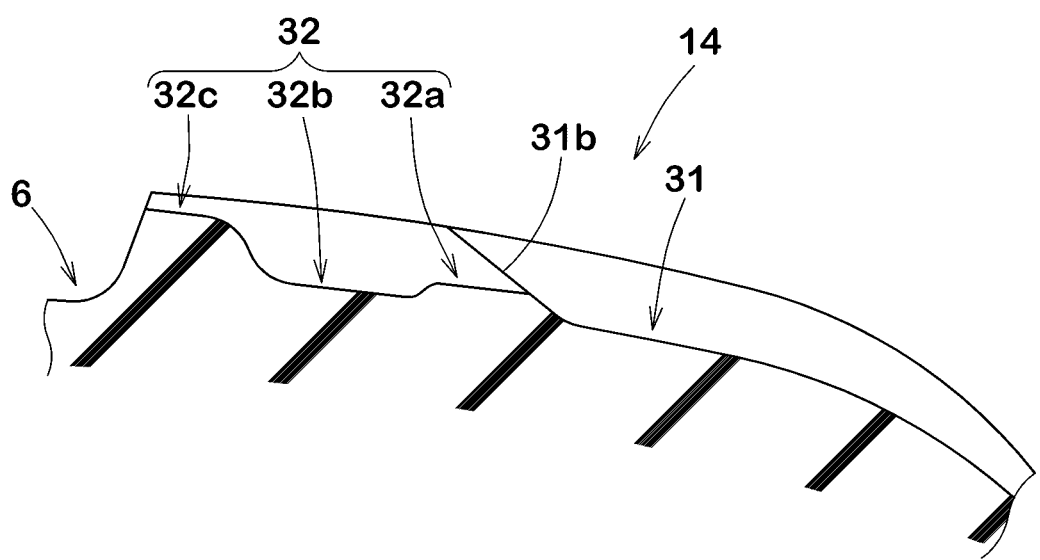
FIG. 7 is a cross-sectional view taken along line C-C of FIG. 6.

FIG. 7 illustrates a cross-sectional view of one of the second shoulder lateral grooves 31 and one of the connecting sipes 32 taken along line C-C of FIG. 6. As illustrated in FIG. 7, each second shoulder lateral groove 31, for example, in an end on the second shoulder main groove 6 side, includes an inclined bottom face 31b inclined at an angle with respect to the tyre axial direction. Thus, it helps to prevent the second shoulder land portion 14 from being formed a portion in which stiffness thereof is abruptly changed.

Each connecting sipe 32, for example, includes a first portion 32a, a second portion 32b and a third portion 32c which have different depths from one another. The first portion 32a is connected to the second shoulder lateral groove 31. The second portion 32b is connected to the first portion 32a on the second shoulder main groove 6 side and has a depth greater than that of the first portion 32a. The third portion 32c is connected to the second portion 32b on the second shoulder main groove 6 side and has a depth smaller than those of the first portion 32a and the second portion 32b. Such a connecting sipe 32 can mitigate stiffness of the second shoulder land portion 14 moderately, improving steering stability and ride comfort in a well-balanced manner.

In each connecting sipe 32, depths of the first portion 32a and the second portion 32b, for example, are greater than that of the raised portions 19 of the second middle lateral grooves 17. A depth of the third portion 32c of each connecting sipe 32 is preferably smaller than that of the raised portions 19 of the second middle lateral grooves 17. Such a connecting sipe 32 can help to prevent uneven wear of the second shoulder land portion 14.

As illustrated in FIG. 6, the connecting sipes 32 are arranged so as to be continuous to the respective second middle sipes 23 smoothly through the second shoulder main groove 6.

Each non-traversing narrow groove 33, for example, extends from the second shoulder main groove 6 and terminates within the second shoulder land portion 14. A length L16 in the tyre axial direction of each non-traversing narrow groove 33, for example, is in a range of from 0.50 to 0.65 times the width W4 in the tyre axial direction of the second shoulder land portion 14. The non-traversing narrow grooves 33 configured as such can improve steering stability and noise performance in a well-balanced manner.

In some preferred embodiments, it is preferable that the length L16 in the tyre axial direction of each non-traversing narrow groove 33 is greater than the length L15 in the tyre axial direction of each connecting sipe 32. Such a non-traversing narrow groove 33 can mitigate stiffness of the second shoulder land portion 14 moderately, improving ride comfort.

It is preferable that the non-traversing narrow grooves 33, for example, are arranged so as to be continuous to the respective second middle lateral grooves 17 smoothly through the second shoulder main groove 6. Such a groove arrangement can help to reduce impact noise since the non-traversing narrow grooves 33 as well as the second middle lateral grooves 17 are easy to open when the second shoulder land portion 14 grounds.

Figure 8:
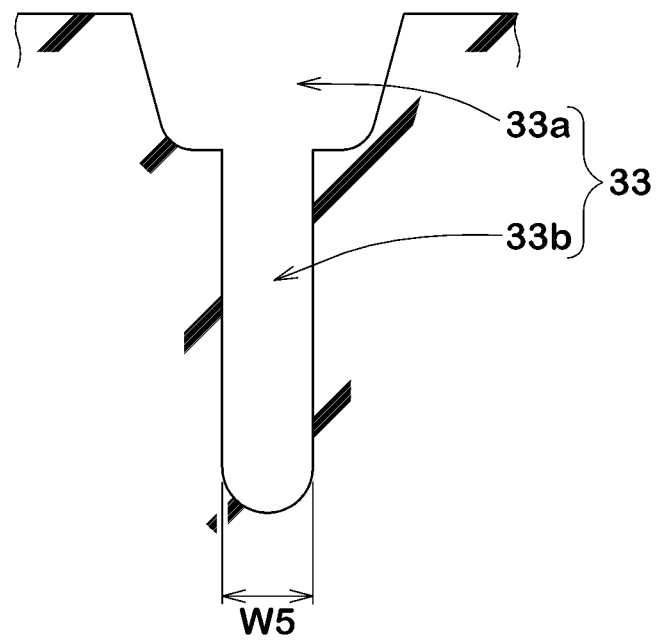
FIG. 8 is a cross-sectional view taken along line D-D of FIG. 6.

FIG. 8 illustrates a cross-sectional view of one of the non-traversing narrow grooves 33 taken along line D-D of FIG. 6. As illustrated in FIG. 8, each non-traversing narrow groove 33, for example, includes an opening portion 33a on a ground contacting surface side and a narrow width portion 33b located inwardly in the tyre radial direction of the opening portion 33a and having a width smaller than that of the opening portion 33a. A width W5 of the narrow width portion 33b, for example, is in a range of from 0.5 to 1.0 mm. The non-traversing narrow grooves 33 can improve the above-mentioned effects without excessive reduction of stiffness of the second shoulder land portion 14.

As illustrated in FIG. 1, the above-mentioned structure can enhance stiffness of the first middle land portion 11 and the first shoulder land portion 13 relative to the land portions 12 and 14. Thus, the tyre 1 can generate large self-aligning torque (SAT). For example, a passenger car with four wheels equipped with the tyres 1 can generate the front cornering power approximate to the rear cornering power since the front cornering power is reduced by large SAT by the front tyres. Hence, a passenger car equipped with the tyres as its front and rear wheels according to the present embodiment, given a slip angle on the front wheels, tends to transit a neutral cornering state where the front cornering force substantially balances with the rear cornering force, exerting superior steering stability.

While the particularly preferable embodiments in accordance with the present disclosure have been described in detail, the present disclosure is not limited to the illustrated embodiments, but can be modified and carried out in various aspects.

EXAMPLE-1

Figure 9:
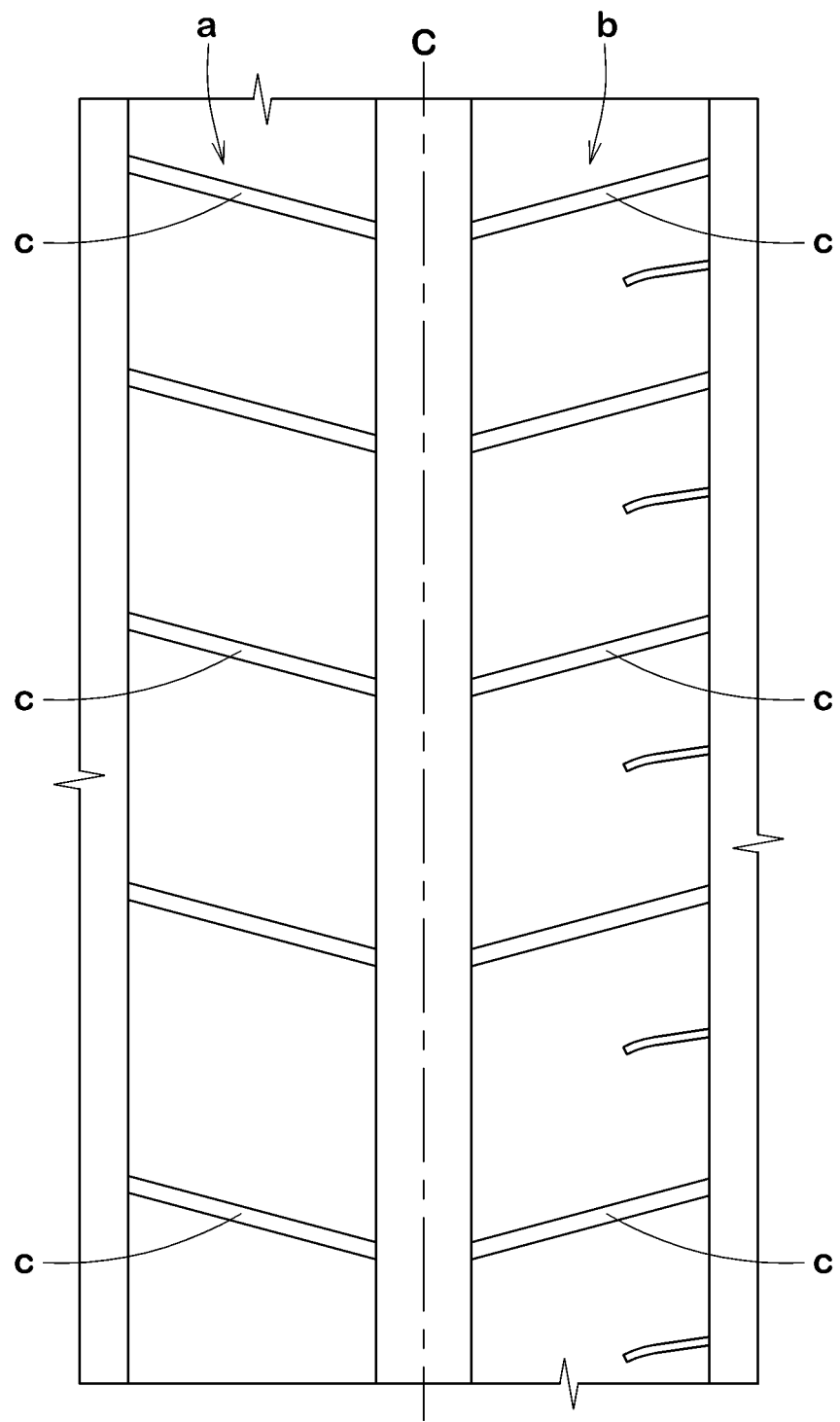
FIG. 9 is an enlarged view of the first middle land portion and the second middle land portion of a tyre according to a comparative example 1.

Tyres (205/55R16) having the basic tread pattern shown in FIG. 1 were manufactured by way of trial based on the detail shown in Table 1. As a comparative example 1 (Ref. 1), as shown in FIG. 9, tyres which includes the first middle land portion (a) and the second middle land portion (b) provided with straight lateral grooves (c) having the same circumferential length of the groove-reference-straight-lines were also manufactured. Note that the tread pattern of comparative example 1 is substantially the same as the tread pattern shown in FIG. 1 except the above-mentioned structure. Then, steering stability, ride comfort and noise performance of each test tyre was tested. The common specification and the test method are as follows:
rim size: 16×6.5J;
tyre inner pressure: front 200 kPa and rear 200 kPa;
test vehicle: FF vehicle having displacement of 1600 cc; and
tyre location: all wheels.

Steering stability test:
A test driver drove the above-mentioned test vehicle on a dry road, and evaluated steering stability by the driver's sense when driving in low speed ranges (40 to 80 km/h) and high-speed ranges (100 to 120 km/h). The test results are shown in Table 1 using a score based on Ref. 1 being 100. The larger value indicates better steering stability.

Ride comfort test:
A test driver drove the above-mentioned test vehicle on a dry road, and evaluated ride comfort by the driver's sense. The test results are shown in Table 1 using a score based on Ref. 1 being 100. The larger value indicates better ride comfort.

Noise performance test:
Car interior noise was measured when the above-mentioned test vehicle was traveling on a dry road having bumps at speed ranges between 40 to 100 km/h in order to evaluate the maximum level of sound pressure of frequency ranges between 100 to 350 Hz. The test results are shown in Table 1 using an index based on Ref. 1 being 100. The smaller value indicates better noise performance.

Table 1 shows the test results.

TABLE 1

|  | Ref. 1 | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Figure showing first and second middle land portions | FIG. 9 | FIG. 2 | FIG. 2 | FIG. 2 | FIG. 2 | FIG. 2 | FIG. 2 | FIG. 2 | FIG. 2 | FIG. 2 |
| <First middle latera grooves> Circumferential lengths L1 of groove-reference-straight-lines/pitch lengths P1 | 0.26 | 0.15 | 0.05 | 0.10 | 0.20 | 0.25 | 0.15 | 0.15 | 0.15 | 0.15 |
| <Second middle latera grooves> Circumferential lengths L2 of groove-reference-straight-lines/pitch lengths P2 | 0.26 | 0.48 | 0.48 | 0.48 | 0.48 | 0.48 | 0.40 | 0.45 | 0.50 | 0.55 |
| Steering stability (score) | 100 | 108 | 107 | 108 | 107 | 105 | 107 | 108 | 107 | 106 |
| Ride comfort (score) | 100 | 103 | 102 | 103 | 104 | 104 | 102 | 103 | 103 | 104 |
| Noise performance (index) | 100 | 95 | 97 | 96 | 95 | 95 | 96 | 95 | 95 | 95 |

From the test results, it is confirmed that the tyres (Ex. 1 to Ex. 9) improve steering stability, ride comfort and noise performance.

EXAMPLE-2

Figure 10:
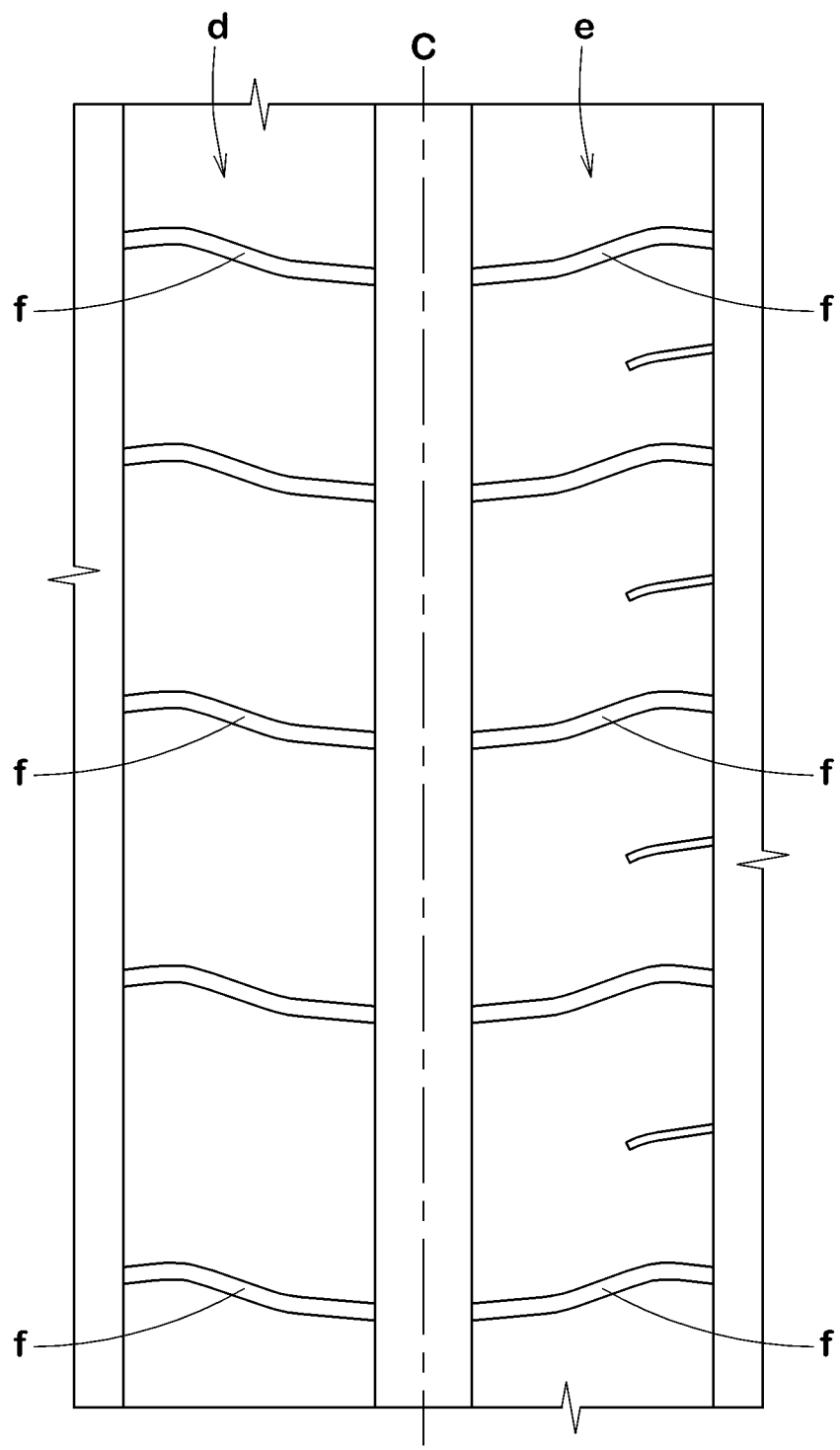
FIG. 10 is an enlarged view of the first middle land portion and the second middle land portion of a tyre according to a comparative example 2.

Tyres (205/55R16) having the basic tread pattern shown in FIG. 1 were manufactured by way of trial based on the detail shown in Table 2. As a comparative example 2 (Ref. 2), as shown in FIG. 10, tyres which includes the first middle land portion (d) and the second middle land portion (e) provided with curved grooves (f) having the center portions having the same angle were also manufactured. Note that the tread pattern of comparative example 2 is substantially the same as the tread pattern shown in FIG. 1 except the above-mentioned structure. Then, steering stability and noise performance of each test tyre was tested. The common specification and the test method are the same as mentioned above. As to the test results, the score as well as the index is indicated based on Ref. 2 being 100.

Table 2 shows the test results.

TABLE 2

|  | Ref. 2 | Ex. 10 | Ex. 11 | Ex. 12 | Ex. 13 | Ex. 14 | Ex. 15 | Ex. 16 | Ex. 17 | Ex. 18 |
| --- | --- | --- | --- | --- | --- | --- | --- | --- | --- | --- |
| Figure showing first and second middle land portions | FIG. 10 | FIG. 2 | FIG. 2 | FIG. 2 | FIG. 2 | FIG. 2 | FIG. 2 | FIG. 2 | FIG. 2 | FIG. 2 |
| Angles θ1 of center portions of first middle lateral grooves (deg.) | 20 | 20 | 5 | 15 | 30 | 40 | 20 | 20 | 20 | 20 |
| Angles θ2 of center portions of second middle lateral grooves (deg.) | 20 | 50 | 50 | 50 | 50 | 50 | 30 | 40 | 55 | 60 |
| Steering stability (score) | 100 | 105 | 105 | 105 | 104 | 103 | 104 | 105 | 104 | 103 |
| Noise performance (index) | 100 | 96 | 97 | 96 | 96 | 95 | 97 | 97 | 96 | 96 |

From the test results, it is confirmed that the tyres (Ex. 10 to Ex. 18) improve steering stability and noise performance.

EXAMPLE-3

Figure 11:
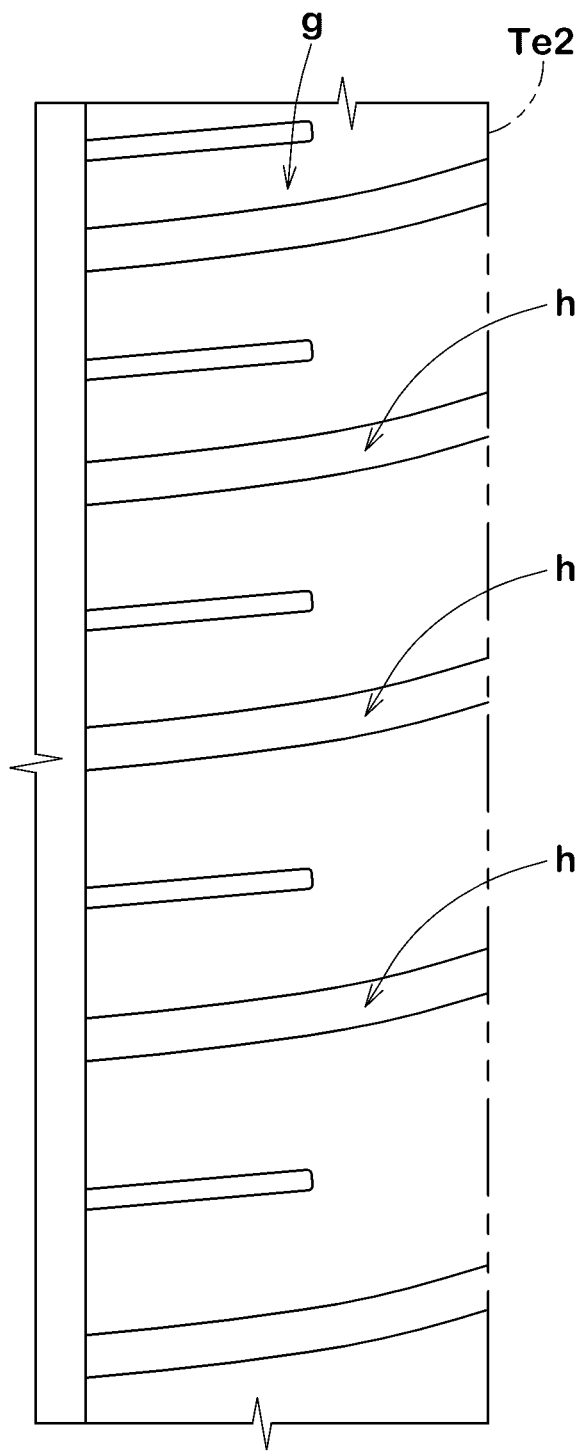
FIG. 11 is an enlarged view of the second shoulder land portion of a tyre according to a comparative example 3.

Tyres (205/55R16) having the basic tread pattern shown in FIG. 1 were manufactured by way of trial based on the detail shown in Table 3. As a comparative example 3 (Ref. 3), as shown in FIG. 11, tyres which includes the second shoulder land portion (g) provided with lateral grooves (h) traversing completely in the tyre axial direction were also manufactured. Further, the tread portion of comparative example 3 is not provided with any connecting sipes but provided with non-traversing narrow grooves which are the same as the non-traversing narrow grooves shown in FIG. 1. Note that the tread pattern of comparative example 3 is substantially the same as the tread pattern shown in FIG. 1 except the above-mentioned structure. Then, steering stability and noise performance of each test tyre was tested. The common specification and the test method are the same as mentioned above. As to the test results, the score as well as the index is indicated based on Ref. 3 being 100.

Table 3 shows the test results.

TABLE 3

|  | Ref. 3 | Ex. 19 | Ex. 20 | Ex. 21 | Ex. 22 | Ex. 23 | Ex. 24 | Ex. 25 | Ex. 26 | Ex. 27 |
| --- | --- | --- | --- | --- | --- | --- | --- | --- | --- | --- |
| Figure showing second shoulder land portion | FIG. 11 | FIG. 6 | FIG. 6 | FIG. 6 | FIG. 6 | FIG. 6 | FIG. 6 | FIG. 6 | FIG. 6 | FIG. 6 |
| Lengths L15 of connecting sipes/width W4 of second shoulder land portion | — | 0.36 | 0.30 | 0.40 | 0.45 | 0.50 | 0.36 | 0.36 | 0.36 | 0.36 |
| Lengths L16 of non-traversing narrow grooves/width W4 of second shoulder land portion | 0.57 | 0.57 | 0.57 | 0.57 | 0.57 | 0.57 | 0.50 | 0.55 | 0.60 | 0.65 |
| Steering stability (score) | 100 | 107 | 104 | 107 | 107 | 108 | 108 | 107 | 107 | 106 |
| Noise performance (index) | 100 | 95 | 94 | 95 | 96 | 97 | 96 | 95 | 95 | 95 |

From the test results, it is confirmed that the tyres (Ex. 19 to Ex. 27) improve steering stability and noise performance.

What is claimed is:

1. A tyre comprising:
   a tread portion having a designated mounting direction to a vehicle, the tread portion comprising
   a first tread edge and a second tread edge to be located outwardly and inwardly of a vehicle, respectively, when being mounted to the vehicle,
   two or more main grooves extending continuously in a tyre circumferential direction between the first tread edge and the second tread edge, and
   two or more land portions divided by the main grooves, wherein
   the main grooves comprise a first shoulder main groove disposed between the first tread edge and a tyre equator, a second shoulder main groove disposed between the second tread edge and the tyre equator, and a crown main groove disposed between the first shoulder main groove and the second shoulder main groove,
   the land portions comprise a first middle land portion defined between the first shoulder main groove and the crown main groove, and a second middle land portion defined between the second shoulder main groove and the crown main groove,
   the first middle land portion is provided with two or more first middle lateral grooves traversing the first middle land portion completely in a tyre axial direction,
   the second middle land portion is provided with two or more second middle lateral grooves traversing the second middle land portion completely in the tyre axial direction,
   in a plan view of the tread portion, each of the first middle lateral grooves and the second middle lateral grooves is a curved groove which comprises a first convex portion located on a first side with respect to a groove-reference-straight-line that connects both ends of a groove centerline of the curved groove and a second convex portion located on a second side with respect to the groove-reference-straight-line,
   a length in the tyre circumferential direction of the groove-reference-straight-line of each first middle lateral groove is smaller than a length in the tyre circumferential direction of the groove-reference-straight-line of each second middle lateral groove, and
   a maximum distance of each first middle lateral groove between a groove edge thereof and the groove-reference-straight-line thereof is smaller than a maximum distance of each second middle lateral groove between a groove edge thereof and the groove-reference-straight-line thereof.

2. The tyre according to claim 1, wherein
the length in the tyre circumferential direction of the groove-reference-straight-line of each second middle lateral groove is smaller than pitch lengths in the tyre circumferential direction of the second middle lateral grooves.

3. The tyre according to claim 1, wherein
the groove-reference-straight-line of each first middle lateral groove is inclined in a first direction with respect to the tyre axial direction, and
the groove-reference-straight-line of each second middle lateral groove is inclined in a second direction which is opposite to the first direction with respect to the tyre axial direction.

4. The tyre according to claim 1, wherein
the land portions comprise a first shoulder land portion defined between the first shoulder main groove and the first tread edge,
the first shoulder land portion is provided with two or more first shoulder lateral grooves traversing the first shoulder land portion completely in the tyre axial direction, and
at least one of the first shoulder lateral grooves comprises a shallow bottom portion having a raised bottom face in an end region on the first shoulder main groove side thereof.

5. The tyre according to claim 1, wherein
the curved groove has an S-shaped manner.

6. A tyre comprising:
a tread portion having a designated mounting direction to a vehicle, the tread portion comprising
a first tread edge and a second tread edge to be located outwardly and inwardly of a vehicle, respectively, when being mounted to the vehicle,
two or more main grooves extending continuously in a tyre circumferential direction between the first tread edge and the second tread edge, and
two or more land portions divided by the main grooves,
wherein
the main grooves comprise a first shoulder main groove disposed between the first tread edge and a tyre equator, a second shoulder main groove disposed between the second tread edge and the tyre equator, and a crown main groove disposed between the first shoulder main groove and the second shoulder main groove,
the land portions comprise a first middle land portion defined between the first shoulder main groove and the crown main groove, and a second middle land portion defined between the second shoulder main groove and the crown main groove,
the first middle land portion is provided with two or more first middle lateral grooves traversing the first middle land portion completely in a tyre axial direction,
the second middle land portion is provided with two or more second middle lateral grooves traversing the second middle land portion completely in the tyre axial direction,
in a plan view of the tread portion, each of the first middle lateral grooves and the second middle lateral grooves comprises a center portion traversing the center location in the tyre axial direction of either one of the first middle land portion or the second middle land portion obliquely, a first outer portion extending from one end side of the center portion at a smaller angle with respect to the tyre axial direction than that of the center portion, and a second outer portion extending from the other end side of the center portion at a smaller angle with respect to the tyre axial direction than that of the center portion,
an angle θ1 of the center portion of each first middle lateral groove with respect to the tyre axial direction is smaller than an angle θ2 of the center portion of each second middle lateral groove with respect to the tyre axial direction,
in each second middle lateral groove, a length in the tyre axial direction of the second outer portion is greater than a length in the tyre axial direction of the first outer portion,
in each of the of the first middle lateral grooves and the second middle lateral grooves,
the center portion comprises a raised portion in which a groove bottom thereof is raised, and
a length in the tyre axial direction of the raised portion is greater than those in the tyre axial direction of the first outer portion and the second outer portion, and
in each first middle lateral groove, a length in the tyre axial direction of the first outer portion is same as a length in the tyre axial direction of the second outer portion.

7. The tyre according to claim 6, wherein
the angle θ1 is in a range of from 5 to 40 degrees.

8. The tyre according to claim 6, wherein
the angle 74 2 is in a range of from 20 to 60 degrees.

9. The tyre according to claim 6, wherein
the land portions comprise a first shoulder land portion defined between the first shoulder main groove and the first tread edge,
the first shoulder land portion is provided with two or more first shoulder lateral grooves traversing the first shoulder land portion completely in the tyre axial direction, and
an inner end in the tyre axial direction of at least one of the first shoulder lateral grooves is located in a different position in the tyre circumferential direction from axially outer ends of the respective first middle lateral grooves.

10. The tyre according to claim 9, wherein
a minimum distance in the tyre circumferential direction between the inner end of the at least one of the first shoulder lateral grooves and the outer ends of the respective first middle lateral grooves is equal to or less than 0.35 times pitch lengths P3 in the tyre circumferential direction of the first shoulder lateral grooves.

11. The tyre according to claim 6, wherein
each of the first and second middle lateral grooves has an S-shaped manner.

12. The tyre according to claim 1, wherein
the crown main groove is located on the tyre equator; and
the first middle lateral grooves are arranged so as to be continuous smoothly to the respective second middle lateral grooves via the crown main groove in such a way that respective regions in which the first middle lateral grooves are elongated along the respective groove longitudinal directions to the crown main groove overlap the respective second middle lateral grooves in the tyre circumferential direction.

* * * * *